United States Patent
Ermolaev et al.

(10) Patent No.: US 8,524,787 B2
(45) Date of Patent: Sep. 3, 2013

(54) PROCESS FOR PRODUCING SYNTHETIC LIQUID HYDROCARBONS AND REACTOR FOR FISCHER-TROPSCH SYNTHESIS

(75) Inventors: Vadim Sergeevich Ermolaev, Moscow (RU); Vladimir Zalmanovich Mordkovich, Moscow (RU); Igor Grigorievich Solomonik, Moscow (RU); Igor Vladimirovich Derevich, Moscow (RU); Lilia Vadimovna Sineva, Moscow (RU); Eduard Borisovich Mitberg, Ekaterinburg (RU)

(73) Assignee: Infra Technologies Ltd., Road Town, Tortola (VG)

( * ) Notice: Subject to any disclaimer, the term of this patent is extended or adjusted under 35 U.S.C. 154(b) by 0 days.

(21) Appl. No.: 13/574,710

(22) PCT Filed: Jan. 31, 2011

(86) PCT No.: PCT/RU2011/000054
§ 371 (c)(1),
(2), (4) Date: Jul. 23, 2012

(87) PCT Pub. No.: WO2011/093749
PCT Pub. Date: Aug. 4, 2011

(65) Prior Publication Data
US 2012/0322898 A1 Dec. 20, 2012

(30) Foreign Application Priority Data
Feb. 1, 2010 (RU) .................................. 2010103081

(51) Int. Cl.
*C07C 27/00* (2006.01)
*F28D 7/00* (2006.01)

(52) U.S. Cl.
USPC ............................ 518/700; 422/201; 422/652

(58) Field of Classification Search
USPC ................................... 518/700; 422/201, 652
See application file for complete search history.

(56) References Cited

U.S. PATENT DOCUMENTS

| | | | |
|---|---|---|---|
| 2007/0299148 A1 | 12/2007 | Verbist | |
| 2008/0118018 A1 | 5/2008 | Schrauwen | |
| 2009/0043114 A1 | 2/2009 | Taheri et al. | |
| 2009/0272673 A1 | 11/2009 | Gaemers | |

FOREIGN PATENT DOCUMENTS

| | | |
|---|---|---|
| DE | 2929300 A1 | 1/1981 |
| GB | 2132111 A | 7/1984 |

OTHER PUBLICATIONS

Derevich, I.V. et al. 2012 "Modeling of hydrodynamics in microchannel reactor for Fischer-Tropsch synthesis" *International Journal of Heat and Mass Transfer* 55: 1695-1708.

*Primary Examiner* — Jafar Parsa
(74) *Attorney, Agent, or Firm* — Knobbe, Martens, Olson & Bear, LLP

(57) ABSTRACT

The disclosure relates to petrochemistry, gas chemistry, coal chemistry, particularly to a synthesis of hydrocarbons $C_5$ and higher from CO and $H_2$ under the Fischer-Tropsch reaction; the invention relates to a process and a system for producing synthetic liquid hydrocarbons. A process for producing synthetic liquid hydrocarbons is provided by catalytic converting syngas under the Fischer-Tropsch reaction on a fixed catalyst bed in a vertical shell and tube reactor with coolant supply into shell wherein as soon as the syngas conversion degree achieves 60-80%, a pressure gradient along the tubes is reduced below 0.1 bar/m and this value is maintained during the whole process. A reactor for Fischer-Tropsch synthesis is provided comprising tubes with catalyst in a shell, the ratio of the tube diameter at the tube outlet to the diameter at the inlet is from 1.5/1 to 2.5/1. The invention gives a possibility to achieve the optimum temperature range in the catalyst bed; it improves heat and mass-transfer and shut out an accumulation of the liquid products in the bottom of the tubes.

7 Claims, 4 Drawing Sheets

PROCESS FOR PRODUCING SYNTHETIC LIQUID HYDROCARBONS AND REACTOR FOR FISCHER-TROPSCH SYNTHESIS

FIELD OF THE INVENTION

The present invention relates to petrochemistry, gas chemistry, coal chemistry, particularly to a synthesis of hydrocarbons $C_5$ and higher from CO and $H_2$ under the Fischer-Tropsch reaction; the invention discloses a process and a system for producing synthetic liquid hydrocarbons.

BACKGROUND OF THE INVENTION

The Fischer-Tropsch process was developed in the past century and the industrial production was opened up at once. Historically the synthesis was realized in fixed-bed reactors and then in reactors with ever more complicated designs due to the requirements of an increase in the catalyst efficiency and a need of solution of rising problems with heat removal.

The Fischer-Tropsch synthesis is carried out at high pressure over catalyst based on a metal selected from Group VIII of the Mendeleev's Periodic Table of the Elements; the process is exothermic.

It is commonly required that a catalytic bed in the Fischer-Tropsch process is characterized by high concentration of catalytically active component in the reaction volume; by small size of the catalyst particles; by high heat conductivity of the catalyst bed; by high surface area of the gas-liquid interphase; and finally by the flow regime close to ideal plug-in. All these requirements define a strong interrelation between selection of the catalyst and selection of the reactor design.

It is well known that the heterogeneous exothermic processes can be carried out technologically in the fluidized reactors, the slurry phase reactors and in the fixed-bed reactors.

In virtue of a simple and detailed working out of the main structural solution the fixed-bed reactors are the most commonly encountered systems in the area of the catalytic technologies. Inside the reaction tubes such reactors have a heterogeneous system that consists of at least two phases: solid particles of the catalyst and spaces in between where the reaction mixture flows in form of gas and/or liquid. Simultaneously the chemical conversions on the catalyst surface and the following physical processes take place in the reactor: the reaction component and product transfer in the bed, heat transfer and gas flow etc.

The formation of the optimum temperature range in the catalyst bed is one of the main problems faced by specialists during the development of the catalytic tubular reactors. The optimal temperature range promotes an improvement of heat and mass transfer in each catalyst pellet.

There is another problem which comes out only in the high-efficiency reactors; this refers to low rate of withdrawal of the liquid products from reaction tubes. An accumulation of the products in the bottom part of the reaction tubes results in a growth of the pressure difference in reactor, a flooding of the reaction tubes and a complete halt of the reaction.

Shell (housing) and tube reactor aka tubular reactor for chemical processes with fixed bed of a catalyst is disclosed (see Laschinskiy A. A., Tolchinskiy A. R., Principles of design and calculation of chemical apparatus, L., Engineering industry, 1970, 752 p.). In such reactor the heat transfer between the reaction mixture and cooling medium is realized through the reactor wall. The catalyst is packed into the tubes of the small diameter (2-8 cm); a coolant (e.g. high pressure steam) circulates in the intertubular space. The important advantage of the tubular reactors is favorable terms for heat removal from the catalyst because the ratio of the cooling surface to the catalyst volume is well over than in other apparatuses.

U.S. 2,240,481 discloses the modification of the shell and tube reactor wherein a boiling liquid (its temperature is regulated by pressure) is used for cooling the tubes with fixed bed of the catalyst. Excess of the generated heat goes to the inner heat of liquid evaporation.

U.S. Pat. No. 7,012,103 relates to a process for producing synthetic liquid hydrocarbons by converting synthesis gas (syngas) under the Fischer-Tropsch reaction on a fixed catalyst bed in a vertical shell and tube reactor and a reactor for Fischer-Tropsch synthesis comprising tubes with catalyst (at least 100, each tube has a height between 2 and 5 meters) in the shell (housing), syngas and coolant inlets, product and steam outlets.

The main drawback of the disclosed process and reactor is low rate of withdrawal of the liquid products from the reaction tubes. An accumulation of the products in the bottom part of the reaction tubes results in a growth of the pressure difference in the reactor, a flooding of the reaction tubes and a complete halt of the reaction.

The commonly accepted methods for overcoming the problem comprise either limitation of productivity by limiting the feedgas flow (this indeed allows possibility for the produced liquid products to flow down) or an increase in temperature beyond an optimum level. The latter method results in poor product quality due to low reaction selectivity for the target products.

SUMMARY OF THE INVENTION

The present invention relates to a process for producing synthetic liquid hydrocarbons by catalytic converting syngas under the Fischer-Tropsch reaction on a fixed catalyst bed in a vertical shell and tube reactor with coolant supply into shell wherein as soon as the syngas conversion degree achieves 60-80%, a pressure gradient along the tubes is reduced below 0.1 bar/m and this value is maintained during the whole process.

The present invention also relates to a reactor for Fischer-Tropsch synthesis comprising tubes with catalyst in a shell, syngas and liquid coolant inlets, product and coolant outlets wherein the ratio of the tube diameter at the tube outlet to the diameter at the inlet is from 1.5/1 to 2.5/1.

Preferably the tubes with catalyst are expandable from top downward.

In one preferred embodiment of the invention the tubes are cylindrical and they consist of two sections.

Moreover the top to bottom section length ratio is preferably from 1/1 to 3/1.

BRIEF DESCRIPTION OF THE DRAWINGS

Certain preferred embodiments and modifications of the invention will become apparent to those skilled in the art from the detailed description having reference to the figures that follow, of which.

DETAIL DESCRIPTION OF PREFERRED EMBODIMENTS

Numerous studies of the inventors demonstrate that the present process for producing synthetic liquid hydrocarbons by catalytic converting syngas under the Fischer-Tropsch on a fixed catalyst bed and reactor for carrying out the process give a possibility to provide high rate of withdrawal of the liquid products (it allows to avoid a flooding of the tubes with the liquid products) and at the same time maintain high productivity, i.e. high gas hour space velocity at least 2000 l/h and an optimum temperature range in the catalyst bed. These facts improve heat- and mass-transfer and allow to avoid an accumulation of the liquid products in the bottom of the tubes (sometimes it can stop the process).

Therefore the present invention provides a process for producing synthetic liquid hydrocarbons by catalytic converting syngas under the Fischer-Tropsch reaction on a fixed catalyst bed in a vertical shell and tube reactor with coolant supply into shell wherein as soon as the syngas conversion degree achieves 60-80%, a pressure gradient along the tubes is reduced below 0.1 bar/m and this value is maintained during the whole process.

As well as the inventors disclose a reactor for Fischer-Tropsch synthesis comprising tubes with catalyst in a shell, syngas and liquid coolant inlets, product and coolant outlets wherein the ratio of the tube diameter at the tube outlet to the diameter at the inlet is from 1.5/1 to 2.5/1.

The required diameter ratio can be achieved by accomplishment of the tubes expandable from top downward or when the tubes are cylindrical and they consist of two sections, moreover the top to bottom section length ratio is preferably from 1/1 to 3/1.

Figure 1:
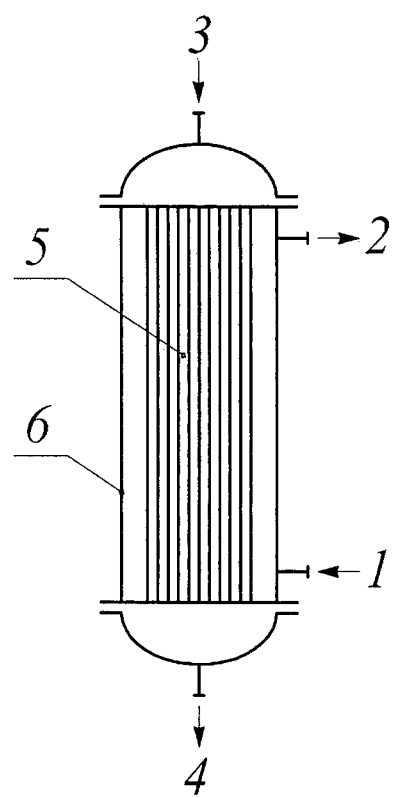
FIG. 1 is a simplified schematic view of a reactor for Fischer-Tropsch synthesis in accordance with the present invention.

Referring initially to FIG. 1, a tubular fixed bed reactor 1 for Fischer-Tropsch synthesis comprises a coolant inlet 1, a coolant outlet 2, a syngas feed inlet 3, a product outlet 4, tubes 5 filled with catalyst, the tubes are bundled inside a shell 6 (the form and design of the tubes are not shown).

Figure 2:
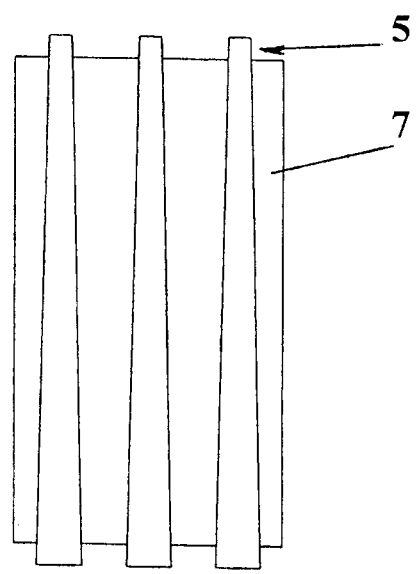
FIG. 2 is a simplified schematic view of few tubes filled with catalyst; they are accomplished expandable from top downward.

FIG. 2 illustrates few tubes 5 filled with a catalyst that are in the shell side 7; the tubes are expandable from top downward.

Figure 3:
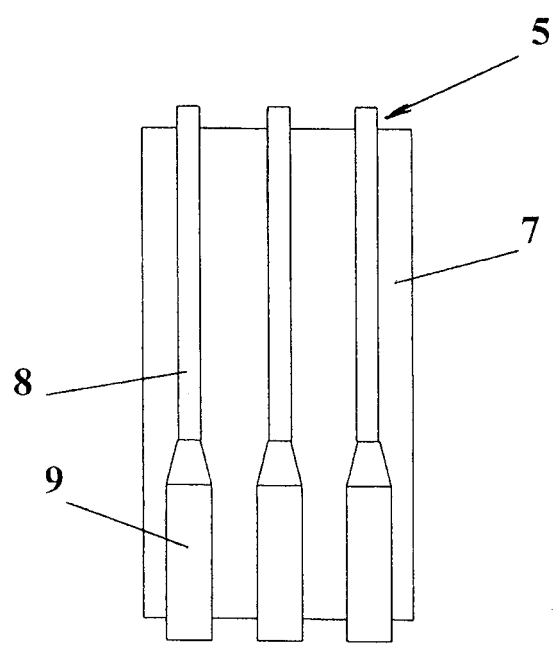
FIG. 3 is a simplified schematic view of few tubes filled with catalyst; they are cylindrical and consist of two sections.

Some tubes 5 filled with a catalyst that are in the shell side 7 are shown in FIG. 3; the tubes consist of two cylindrical sections 8 and 9 of the different diameter.

The claimed process in the present reactor is carried out as follows: syngas with a gas hour space velocity at least 2000 l/h is fed into the tubes 5 filled with a catalyst through an inlet 3. At the same time a coolant (e.g. water) is input into a shell 6 through an inlet 1 at the temperature of the lower limit of the optimum temperature range for the Fischer-Tropsch process for the selected catalyst. When syngas contacts the catalyst, the gas converts into the liquid hydrocarbons and water with release of the heat under the Fischer-Tropsch reaction. The generated heat is removed through the tube wall and is transferred to coolant that in turn is converted into steam partially so the transferred heat is absorbed through evaporation heat. The products are output through an outlet 4, the used coolant—through an outlet 2.

The results of the numerous studies of the inventors given in examples demonstrate that the following method allows to maintain the optimum temperature range in the catalyst bed in the tubes 5 and avoid a flooding of the tubes with the liquid products: as soon as the syngas conversion degree achieves 60-80%, a pressure gradient along the tubes is reduced below 0.1 bar/m and this value is maintained during the whole process.

One of the embodiments of the present reactor is a design wherein the ratio of the tube diameter at the tube outlet to the diameter at the inlet is from 1.5/1 to 2.5/1.

At such diameter ratio 60-80% syngas passing through the top section 8 (when the tubes consist of few sections) converts into the liquid products. The obtained gas-liquid mixture enters into the bottom section 9 of the tube 5, wherein the additional conversion of syngas takes place to degree of 80-96%. Due to bigger diameter of the bottom section 9 the process partly departs the regime of the thermal stability, this fact is theoretically based in the following reference (Derevich I. V. et. al., Mathematical simulation of heat and mass transfer in reactor for Fischer-Tropsch synthesis and a new approach for experimental set-up, In: Current trends in gas chemistry development, Under the editorship of Vladimirov A. I. and Lapidus A. L., Proceedings of Moscow seminar of gas chemistry, 2006-2007, issue 4, Moscow, I. M. Gubkin Russian State University of Oil and Gas, 2008, pp. 211-245).

Therefore when the temperature of the catalyst bed in the tubes 5 in the top section is maintained nearly equal to the coolant temperature, the temperature in the bottom section 9 is higher by 1-7 degrees. This fact results in the reduction of viscosity of the liquid product and partial evaporation of the produced liquid. In such a way a pressure gradient in the bottom section 9 does not exceed 0.1 bar/m and this value is maintained during the whole process.

Similarly when the tubes 5 filled with a catalyst expand from top downward, as soon as the syngas conversion degree achieves 60-80%, a pressure gradient along the tubes is reduced below 0.1 bar/m and this value is maintained during the whole process.

Therefore the well timed withdrawal of the liquid products is provided and a flooding of the reactor is avoided. The effect is further intensified due to the following process: the bigger diameter of the tubes in the bottom part results in a smaller cross section for the coolant (cooling water) flow and hence decrease in heat removal from the bottom part of the tubes.

The following examples illustrate that the known similar reactors with the same whole length of the tubes and the same flow of syngas demonstrate either a flooding of the bottom part of the reactor (at the smaller diameter of the tube with the catalyst) or complete runaway from the regime of the thermal stability in the top part of the reactor and inadmissible temperature rise (the latter happens at larger diameter of the tube).

EXAMPLES

Example 1

In a shell and tube reactor with the cylindrical tubes of whole length 6 m consisting from two sections and filled with a catalyst syngas is fed at the pressure 21 bar and gas flow-rate per one tube 4 kg/h (which is equivalent of gas hour space velocity 3000 l/h).

2.5 mm cobalt catalyst pellets filled in the tube porosity of 0.4 are used; the catalyst has the optimum temperature range 210-217° C. at the mentioned gas hour space velocity. Water is fed into the shell at pressure 19.1 bars (absolute) at temperature 210° C.

The diameter of the bottom section is 50 mm, the diameter of the top section is 25 mm, and the ratio is 2/1.

The length of the top section is 3 m; the bottom –3 m, and the ratio is 1/1.

By the exit of the top section the conversion degree achieves 60% and the pressure gradient is 0.6 bar/m.

At the entrance to the bottom section the pressure gradient is below 0.1 bar/m and the reaction temperature increases from 210 to 217° C.

Figure 4:
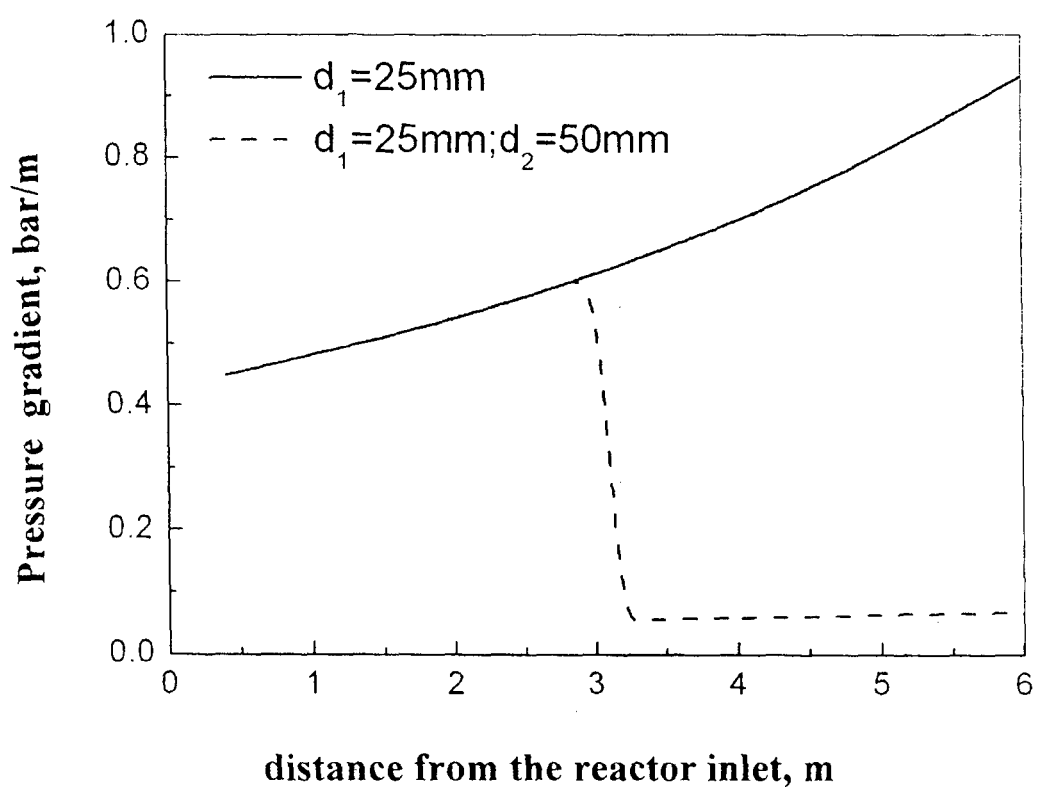
FIG. 4 is a comparative graph of behaviour for a pressure gradient along the tubes in accordance with the known process and for the embodiment with the tubes of two sections with the different diameters.

At the outlet from the reactor the degree of conversion is 80%; complete pressure difference along the reactor length is 1.5 bars. The comparative graph of behaviour of the pressure gradient along the reactor length for the example is shown in FIG. 4.

Other examples are similar to this one, the numerical values for rate 4 kg/h per one tube are summarized in Table 1.

For all examples the whole length of the tubes filled with catalyst is 6 m, syngas is fed in the inlet at pressure 21 bar and rate of 4 kg/h per one tube.

2.5 mm cobalt catalyst pellets filled in the tube porosity of 0.4 are used; the catalyst has the optimum temperature range 210-217° C. at the mentioned gas hour space velocity. Water is fed into the shell at pressure 19.1 bars (absolute) at temperature 210° C.

TABLE 1

Results of the examples

| Parameters | Number of example | | | | |
|---|---|---|---|---|---|
| | 1 | 2 | 3 | 4 | 5 |
| Diameter of bottom section, mm | 50 | 50 | 50 | 37 | 50 |
| Diameter of top section, mm | 25 | 25 | 25 | 25 | 20 |
| Length of top section, m | 3 | 4 | 4.5 | 3 | 4.5 |
| Length of bottom section, m | 3 | 2 | 1.5 | 3 | 1.5 |
| Conversion to Fischer-Tropsch products by the exit of top section, % | 60 | 75 | 80 | 60 | 60 |
| Conversion to Fischer-Tropsch products at outlet of reactor, % | 80 | 90 | 96 | 80 | 70 |
| Pressure gradient in bottom section, bar/m | <0.1 | <0.1 | <0.1 | <0.1 | <0.1 |
| Reaction temperature in bottom section, ° C. | 217 | 215 | 212 | 212 | 217 |
| Complete pressure drop in reactor, bar | 1.5 | 2.2 | 2.6 | 1.8 | 2.2 |
| Consumed power on gas compression in the whole flowsheet, kW | 1.6 | 1.5 | 1.5 | 1.6 | 1.8 |

| Parameters | Number of example | | | |
|---|---|---|---|---|
| | 6 Expandable tapered tube | 7 known | 8 known | 9 known |
| Diameter of bottom section, mm | outlet 50 | 25 (uniform diameter) | 50 (uniform diameter) | 37 (uniform diameter) |
| Diameter of top section, mm | inlet 20 | | | |
| Length of top section, m | 6 (without sections) | 6 (without sections) | 6 (without sections) | 6 (without sections) |
| Length of bottom section, m | | | | |
| Conversion to Fischer-Tropsch products at exit of top section, % | conversion 70% is achieved at the distance of 4 m of inlet | Inapplicable | Inapplicable | Inapplicable |
| Conversion to Fischer-Tropsch products at outlet of reactor, % | 80 | <5 (failure of reaction)* | <5 (failure of reaction)** | 70 |
| Pressure gradient in bottom section, bar/m | Upon achievement conversion 70% gradient is 0.1 bar/m | Inapplicable | Inapplicable | Inapplicable |
| Reaction temperature in bottom section, ° C. | Upon achievement conversion 70% temperature 215-217 | 210 | 290 | 220 |
| Complete pressure drop in reactor, bar | 2.2 | 20 | 1.2 | 10 |
| Consumed power on gas compression in the whole flowsheet, kW | 1.8 | Inapplicable (failure of reaction because of flooding of the reaction tubes) | Inapplicable (failure of reaction because of sintering and deactivation of catalyst) | 4.1 |

*In 2-3 hours after the beginning of the reaction the tubes filled with catalyst are flooded by liquid products, the process is near to stopping.
**The catalyst temperature is increased well above the optimum range, in result the catalyst is sintered and deactivated.

The Table 1 demonstrates that the performance of the present process (Examples 1-6) gives an option to provide quite high rate of withdrawal of liquid products, maintain an optimum temperature range in the catalyst bed and allow to avoid an accumulation of the liquid products in the bottom of the tubes.

Examples 7-9 illustrate that use of the known process results in a flooding of tubes with liquid products and unavoidable failure of reaction (Example 7) or great deviation from the optimum temperature resulting in catalyst deactivation and stopping of reaction (Example 8) or to partial flooding of tubes with simultaneous deviation from the optimum temperature that establish unfavorable conditions for the catalyst performance and results in increase of consumed power on gas squeeze in process design (Example 9).

The invention claimed is:

1. A process for producing synthetic liquid hydrocarbons by comprising:
   (a) catalytically converting syngas by the Fischer-Tropsch reaction in a tube reactor comprising a shell and vertical tubes located within the shell, wherein the reactor is configured so that a coolant supply can be fed into the shell;
   (b) reducing a pressure gradient at the bottom of the tubes in the tube reactor to below 0.1 bar/m when 60-80% of the syngas is converted to liquid hydrocarbons; and
   (c) maintaining the pressure gradient at the bottom of the tubes in the tube reactor at below 0.1 bar/m during the remainder of the process.

2. A reactor for Fischer-Tropsch synthesis of liquid hydrocarbons from syngas comprising:
   (a) a shell,
   (b) tubes each comprising a tube inlet and a tube outlet, wherein the tubes comprise catalyst, and wherein the tubes are located within the shell,
   (c) a syngas inlet,
   (d) a liquid coolant inlet entering into said shell,
   (e) a product outlet, and
   (f) a coolant outlet exiting from said shell,
   wherein the tubes have an increased cross-sectional diameter at the bottom compared to the top so that, during synthesis of liquid hydrocarbons from syngas, a pressure gradient at the bottom of the tubes in the tube reactor is reduced to below 0.1 bar/m when 60-80% of the syngas is converted to liquid hydrocarbons.

3. The reactor of claim 2, wherein the ratio of the tube diameter at the tube outlet to the tube diameter at the tube inlet is from 1.5/1 to 2.5/1.

4. The reactor of claim 2, wherein the tubes are cylindrical.

5. The reactor of claim 2, wherein the tubes consist of two sections.

6. The reactor of claim 2, wherein the ratio of a top section length of the tubes to a bottom section length of the tubes is from 1/1 to 3/1.

7. The reactor of claim 6, wherein the tubes are cylindrical and consist of two sections.

* * * * *